United States Patent
Army et al.

(10) Patent No.: US 10,787,266 B2
(45) Date of Patent: Sep. 29, 2020

(54) FAN BYPASS AND SHUTOFF CHECK VALVE

(71) Applicant: Hamilton Sundstrand Corporation, Charlotte, NC (US)

(72) Inventors: Donald E. Army, Enfield, CT (US); Frederick Peacos, III, North Scituate, RI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/655,802

(22) Filed: Oct. 17, 2019

(65) Prior Publication Data

US 2020/0047891 A1  Feb. 13, 2020

Related U.S. Application Data

(62) Division of application No. 15/481,661, filed on Apr. 7, 2017, now Pat. No. 10,486,816.

(51) Int. Cl.
| | |
|---|---|
| *B64D 13/06* | (2006.01) |
| *F04D 19/02* | (2006.01) |
| *F04D 27/02* | (2006.01) |
| *B64D 41/00* | (2006.01) |
| *B64D 13/02* | (2006.01) |

(52) U.S. Cl.
CPC .......... *B64D 13/06* (2013.01); *B64D 41/007* (2013.01); *F04D 19/02* (2013.01); *F04D 27/0215* (2013.01); *B64D 13/02* (2013.01); *B64D 2013/0603* (2013.01); *B64D 2013/0618* (2013.01)

(58) Field of Classification Search
CPC ....................... B64D 13/06; B64D 2013/0603; B64D 13/02; B64D 41/007; B64D 2013/0618; F04D 27/0215
See application file for complete search history.

(56) References Cited

U.S. PATENT DOCUMENTS

| | | | | |
|---|---|---|---|---|
| 4,865,267 A | * | 9/1989 | Severson | ............... B64D 13/00 244/53 B |
| 5,133,194 A | * | 7/1992 | Army, Jr. | ............... B64D 13/00 415/117 |
| 5,145,124 A | * | 9/1992 | Brunskill | ............... B64D 13/06 244/118.5 |

(Continued)

FOREIGN PATENT DOCUMENTS

| | | |
|---|---|---|
| DE | 1805658 A1 | 7/1970 |
| WO | 9105673 A1 | 5/1991 |

OTHER PUBLICATIONS

European Search Report Issued in EP Application No. 18166271.9, dated Sep. 12, 2018, 8 Pages.

*Primary Examiner* — Kun Kai Ma
(74) *Attorney, Agent, or Firm* — Cantor Colburn LLP

(57) ABSTRACT

A ram air fan and fan bypass shutoff check valve assembly includes a ram air fan configured to draw an airflow through a fan inlet, and a ram fan bypass duct positioned downstream of the ram air fan. The ram fan bypass duct includes a valve assembly configured to selectably direct the airflow through the ram air fan when the valve assembly is in an open position, and direct the airflow through a bypass duct thereby bypassing the ram air fan when the valve assembly is in a closed position.

4 Claims, 8 Drawing Sheets

(56) References Cited

U.S. PATENT DOCUMENTS

| | | | |
|---|---|---|---|
| 5,438,823 A * | 8/1995 | Loxley | F01D 25/18 |
| | | | 165/41 |
| 5,664,760 A | 9/1997 | Army, Jr. et al. | |
| 5,887,445 A | 3/1999 | Murry et al. | |
| 6,729,156 B2 | 5/2004 | Sauterleute et al. | |
| 8,707,721 B2 | 4/2014 | Scherer et al. | |
| 9,327,243 B2 | 5/2016 | Jojic et al. | |
| 9,611,941 B1 | 4/2017 | Defelice et al. | |
| 2001/0025506 A1 | 10/2001 | Buchholz et al. | |
| 2002/0166318 A1 | 11/2002 | Baker et al. | |
| 2008/0149180 A1 | 6/2008 | Parris et al. | |
| 2009/0014593 A1 | 1/2009 | Westenberger et al. | |
| 2011/0151763 A1 | 6/2011 | Selchert et al. | |
| 2011/0259546 A1 * | 10/2011 | DeFrancesco | B64D 13/00 |
| | | | 165/42 |
| 2012/0286181 A1 | 11/2012 | Labrie et al. | |
| 2013/0109290 A1 | 5/2013 | Jones et al. | |
| 2014/0048229 A1 | 2/2014 | Cuthbert | |
| 2014/0178173 A1 | 6/2014 | Colson et al. | |
| 2014/0199931 A1 | 7/2014 | Hipsky | |
| 2014/0352348 A1 | 12/2014 | Army, Jr. et al. | |
| 2015/0004011 A1 | 1/2015 | Army et al. | |
| 2016/0050791 A1 | 2/2016 | Pal | |
| 2016/0229541 A1 | 8/2016 | Bruno et al. | |
| 2016/0312648 A1 | 10/2016 | Bruno et al. | |
| 2016/0369904 A1 | 12/2016 | Dowd et al. | |
| 2017/0268838 A1 | 9/2017 | Army et al. | |

* cited by examiner

FAN BYPASS AND SHUTOFF CHECK VALVE

CROSS-REFERENCE TO RELATED APPLICATIONS

This application is a divisional application of U.S. patent application Ser. No. 15/481,661 filed Apr. 7, 2017, the contents of which are incorporated by reference herein in their entirety.

BACKGROUND

Exemplary embodiments pertain to aircraft environmental control systems. More particularly, the present disclosure relates to a bypass control of a ram air fan for an aircraft environmental control system.

Environmental control systems (ECS's) supply airflow to an interior of an aircraft to condition, for example, a passenger cabin, crew compartment and/or cargo compartment. In some ECS architectures a ram air fan is utilized to draw ram air into the ECS and across a ram air heat exchanger to condition a fluid flowing through the ram air heat exchanger. The ram air fan is driven by, for example an electric motor or a turbine. The typical air bearing ram air fan is not required to operate during flight for performance reasons, but will uncontrollably windmill during flight, if not driven by an electric motor or turbine. To control ram air fan rotation during flight and to keep the rotating assembly supported by an air film, the ram air fan is typically powered to operate at a specified minimum speed.

BRIEF DESCRIPTION

In one embodiment, a ram air fan and fan bypass shutoff check valve assembly includes a ram air fan configured to draw an airflow through a fan inlet, and a ram fan bypass duct positioned downstream of the ram air fan. The ram fan bypass duct includes a valve assembly configured to selectably direct the airflow through the ram air fan when the valve assembly is in an open position, and direct the airflow through a bypass duct thereby bypassing the ram air fan when the valve assembly is in a closed position.

Additionally or alternatively, in this or other embodiments the valve assembly includes a support having a plurality of support openings therein in fluid communication with the bypass duct, an inner cage positioned in the support having a plurality of cage openings therein, and a plurality of flappers rotatably secured to the inner cage. The plurality of flappers are movable between the open position covering the plurality of support openings, and the closed position covering the plurality of cage openings.

Additionally or alternatively, in this or other embodiments the plurality of flappers are biased to the closed position.

Additionally or alternatively, in this or other embodiments each flapper of the plurality of flappers includes a spoiler extending from an outer surface of the flapper over which the airflow from the bypass duct is directed to urge the flapper into the closed position.

Additionally or alternatively, in this or other embodiments the inner cage includes a hub, an outer ring, and a plurality of spokes extending from the hub to the outer ring. The plurality of cage openings are formed between adjacent spokes of the plurality of spokes.

Additionally or alternatively, in this or other embodiments the plurality of spokes are aerodynamically shaped.

Additionally or alternatively, in this or other embodiments the plurality of flaps rotate less than 45 degrees between the open position and the closed position.

Additionally or alternatively, in this or other embodiments airflow through the bypass flow and airflow through the ram air fan exit the ram air fan assembly at a common passage exit.

In another embodiment, an environmental control system for an aircraft includes a ram air heat exchanger and a ram air fan assembly operably connected to the ram air heat exchanger and configured to urge an airflow across the ram air heat exchanger. The ram air fan assembly includes a ram air fan and a ram fan bypass duct positioned downstream of the ram air fan. The ram fan bypass duct includes a valve assembly configured to selectably direct the airflow through the ram air fan when the valve assembly is in an open position, and direct the airflow through a bypass duct thereby bypassing the ram air fan when the valve assembly is in a closed position.

Additionally or alternatively, in this or other embodiments the valve assembly includes a support having a plurality of support openings therein in fluid communication with the bypass duct, an inner cage located in the support having a plurality of cage openings therein, and a plurality of flappers rotatably secured to the inner cage. The plurality of flappers movable between the open position covering the plurality of support openings, and the closed position covering the plurality of cage openings.

Additionally or alternatively, in this or other embodiments the plurality of flappers are biased to the closed position.

Additionally or alternatively, in this or other embodiments each flapper of the plurality of flappers includes a spoiler extending from an outer surface of the flapper over which the airflow from the bypass duct is directed to urge the flapper into the closed position.

Additionally or alternatively, in this or other embodiments the inner cage includes a hub, an outer ring, and a plurality of spokes extending from the hub to the outer ring. The plurality of cage openings are formed between adjacent spokes of the plurality of spokes.

Additionally or alternatively, in this or other embodiments the plurality of spokes are aerodynamically shaped.

Additionally or alternatively, in this or other embodiments the plurality of flaps rotate less than 45 degrees between the open position and the closed position.

In yet another embodiment, a check valve for a ram air fan assembly includes a support having a plurality of support openings therein in fluid communication with the bypass duct, an inner cage positioned in the support having a plurality of cage openings therein, and a plurality of flappers rotatably secured to the inner cage. The plurality of flappers are movable between the open position covering the plurality of support openings, and the closed position covering the plurality of cage openings.

Additionally or alternatively, in this or other embodiments the plurality of flappers are biased to the closed position.

Additionally or alternatively, in this or other embodiments each flapper of the plurality of flappers includes a spoiler extending from an outer surface of the flapper over which the airflow from a bypass duct is directed to urge the flapper into the closed position.

Additionally or alternatively, in this or other embodiments the inner cage includes a hub, an outer ring, and a plurality of spokes extending from the hub to the outer ring, the plurality of cage openings formed between adjacent spokes of the plurality of spokes.

Additionally or alternatively, in this or other embodiments the plurality of spokes are aerodynamically shaped.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
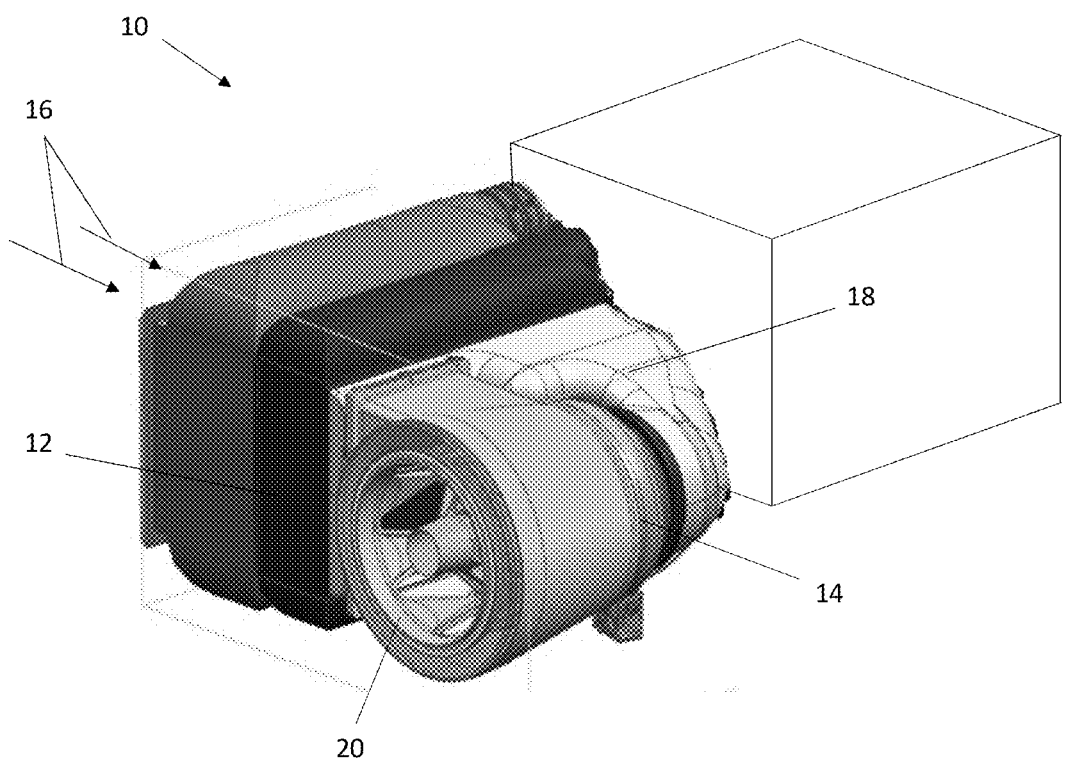
FIG. 1 is schematic view of an embodiment of an environmental control system for an aircraft.

Referring to FIG. 1, a schematic illustration of an environmental control system (ECS) 10 for an aircraft is shown. The ECS 10 includes a ram air heat exchanger 12 and a ram air fan assembly 14 to draw a ram airflow 16 across the ram air heat exchanger 12 to condition a fluid flowing through the ram air heat exchanger 12. The ram airflow 16 then flows through ram air passage 18, through the ram air fan assembly 14 and out of a passage exit 20.

Figure 2:
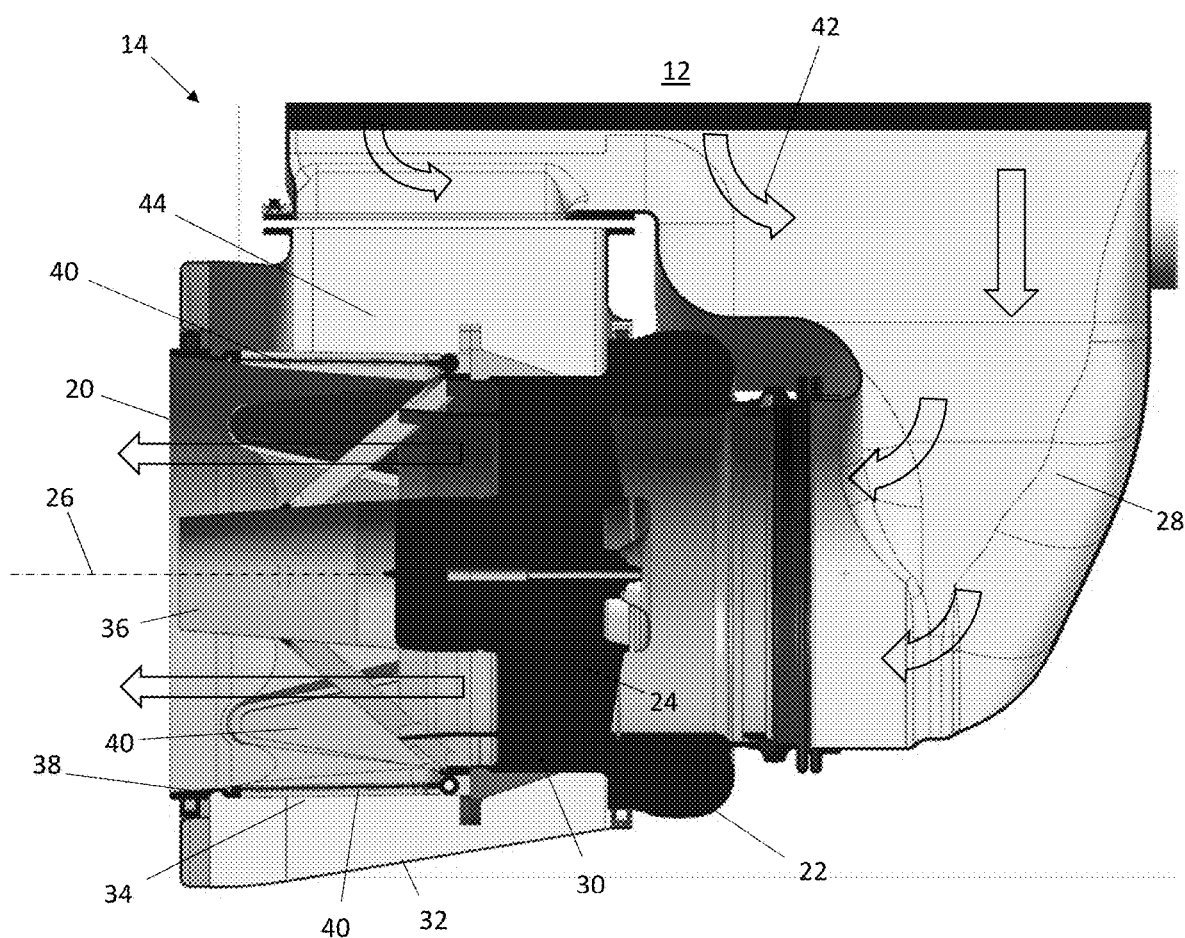
FIG. 2 is a first cross-sectional view of an embodiment of a ram air fan and fan bypass/shutoff check valve assembly.

Referring to FIG. 2, the ram air fan assembly 14 includes a fan housing 22, in which a ram air fan 24 is located, and is rotatable about a central axis 26. The fan housing 22 is in flow communication with the ram air duct 28 downstream of the ram air heat exchanger 12. In the embodiment illustrated, the ram air fan 24 is driven by a tip turbine 30 located in the fan housing 22 radially outboard of the ram air fan 24. A ram fan bypass duct 32 is located downstream of the fan housing 22 and includes a fan bypass/shutoff check valve consisting of an outer housing 34 and an inner cage 36 located therein. The outer housing 34 includes a support 38 and a plurality of flappers 40 rotationally movable between an opened position shown in FIG. 2 in which airflow 42 proceeds through the ram air fan 24 and through the passage exit 20, and a bypass position, shown in FIG. 3, in which airflow 42 bypasses the ram air fan 24 and proceeds through a bypass passage 44 in the ram fan bypass duct 32 to the passage exit 20.

Figure 4:
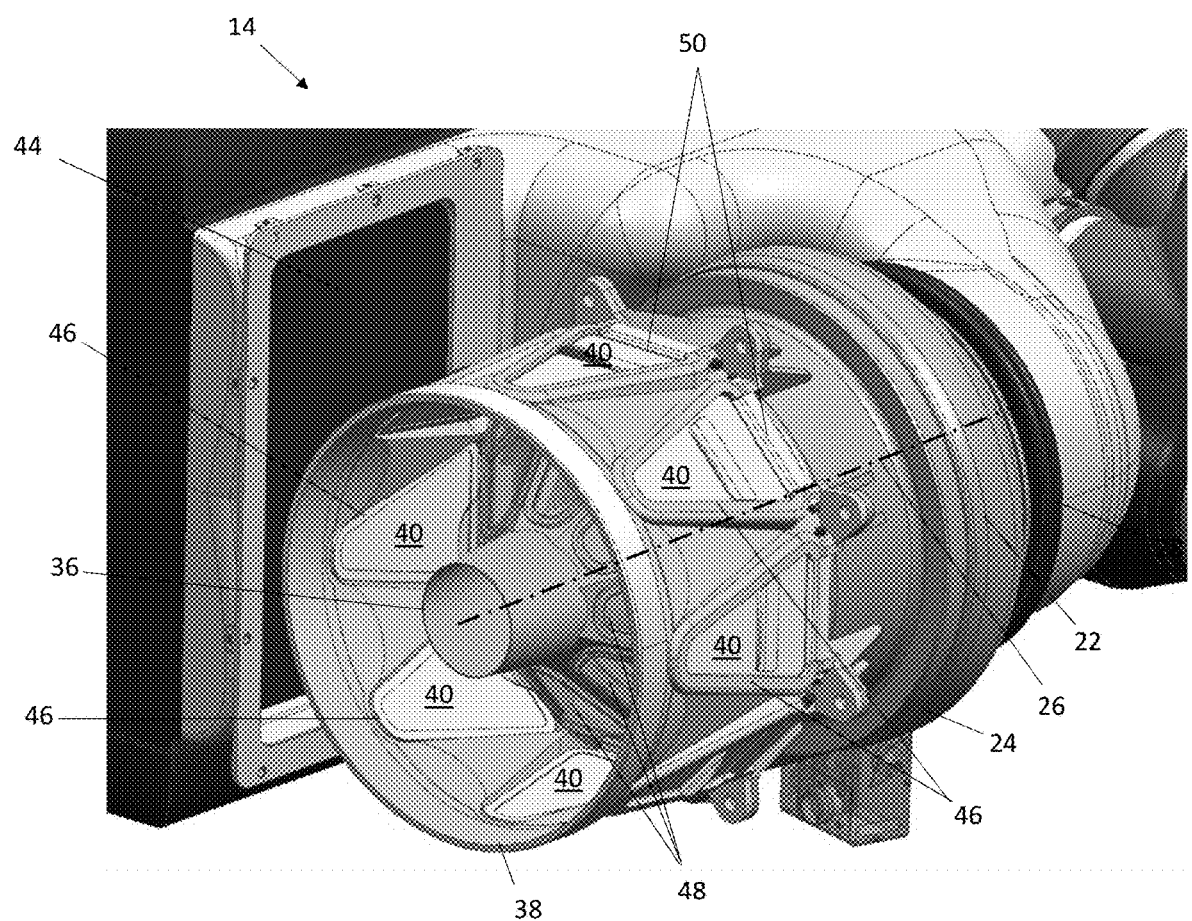
FIG. 4 is a partial perspective view of an embodiment of a ram air fan and fan bypass/shutoff check valve assembly.

Referring now to FIG. 4, the support 38 includes a plurality of support openings 46, the quantity of support openings 46 corresponding to the quantity of flappers 40 in the plurality of flappers 40. In some embodiments, there are 8 support openings 46 and 8 flappers 40, but it is to be appreciated that other quantities may be used. When in the opened position, as shown in FIG. 2 and FIG. 4, each flapper 40 engages to the support 38, closing a respective support opening 46. In some embodiments, the support openings 46 are recessed into the support 38 such that when the flapper 40 engages the support 38 at the support opening 46 an inner flapper surface is flush with an inner support surface, such that there is a positive seal and a smooth flowpath along the inner support surface, reducing pressure drop along the support 38.

Figure 5:
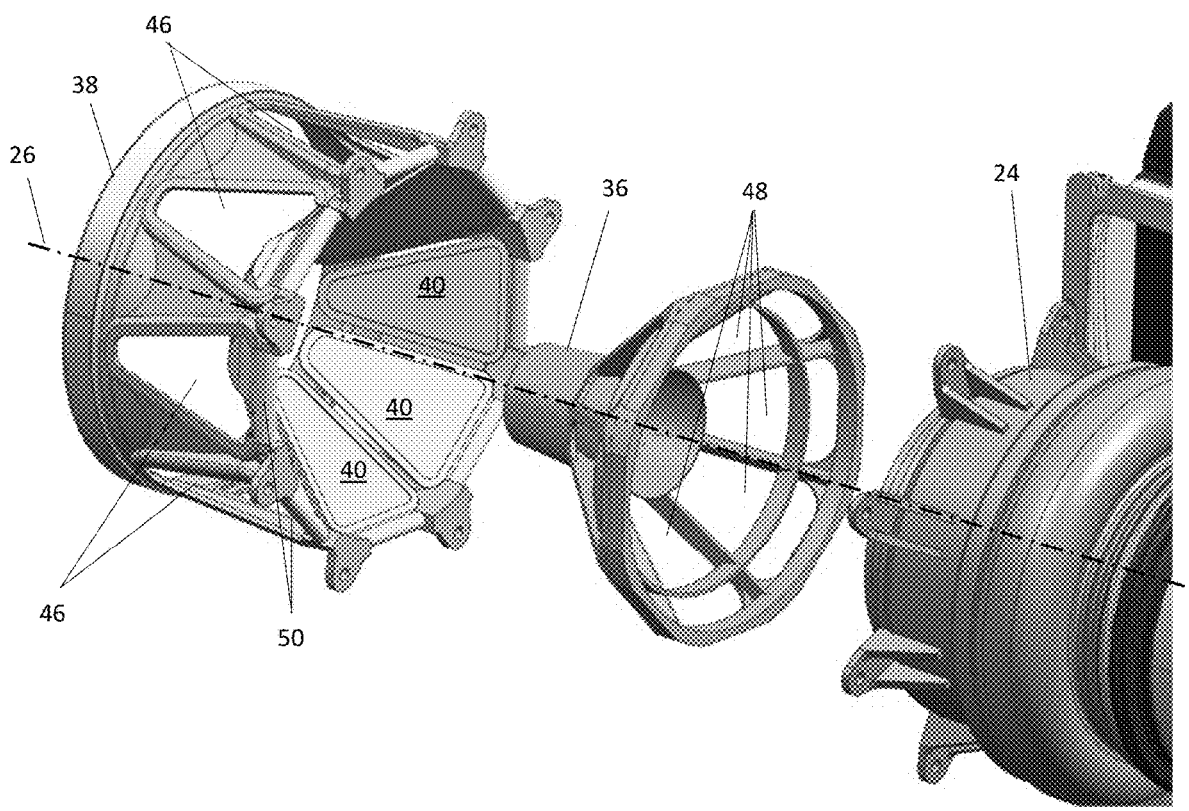
FIG. 5 is a partially exploded view of an embodiment of a ram air fan and fan bypass/shutoff check valve assembly.

Further, the inner cage 36 includes a plurality of inner cage openings 48, shown best in the exploded view of FIG. 5. In the view of FIG. 2 and FIG. 4, with the flappers 40 in the opened position, the airflow 42 is directed from the ram air fan 24, through the plurality of inner cage openings 48, and through the passage exit 20. When the ram air fan 24 is operating, positive air pressure across the ram air fan 24 forces the flappers 40 into the opened position.

Figure 3:
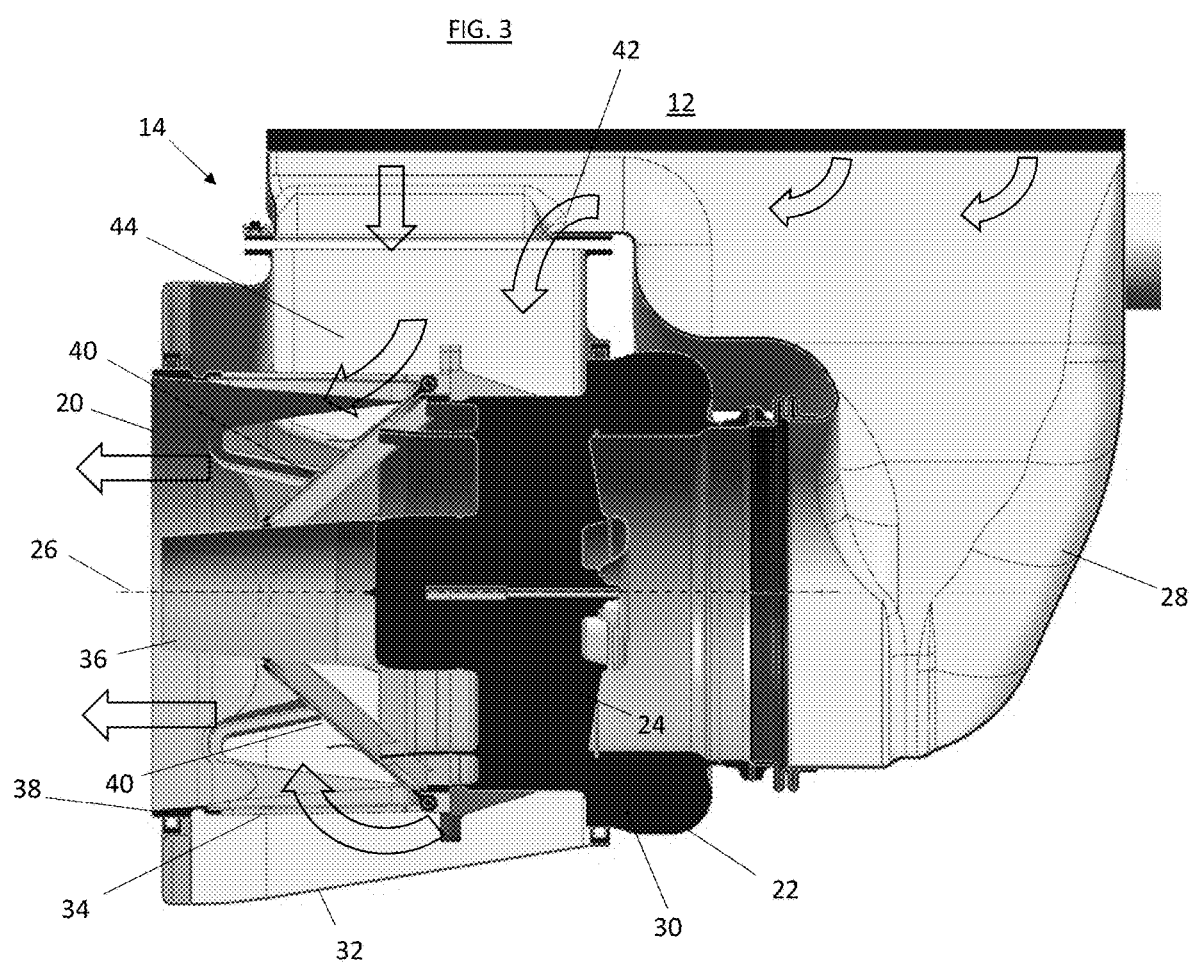
FIG. 3 is a second cross-sectional view of an embodiment of a ram air fan and fan bypass/shutoff check valve assembly.
Figure 6:
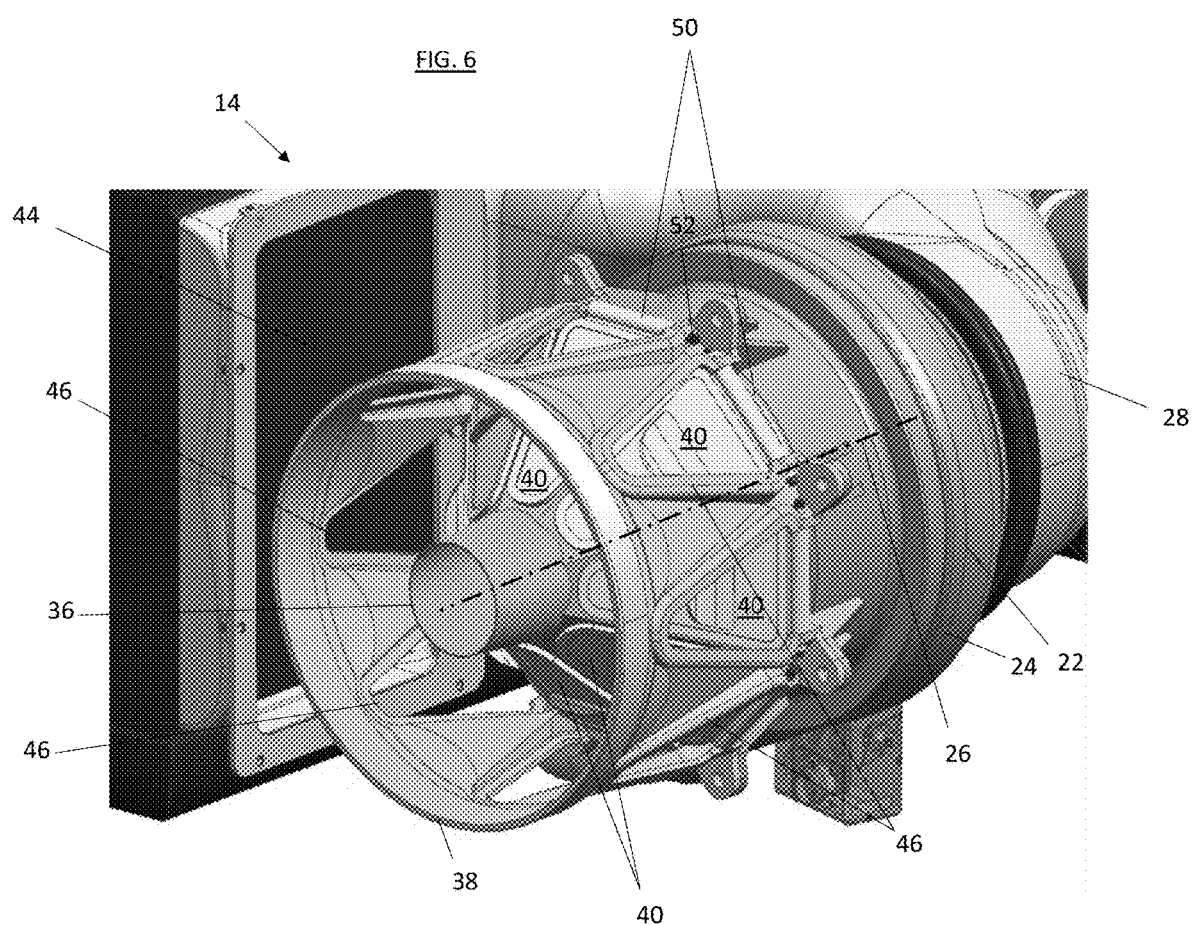
FIG. 6 is another partial perspective view of an embodiment of a ram air fan and fan bypass/shutoff check valve assembly.

FIG. 6 further illustrates the plurality of flappers 40 in a closed position. When in the closed position, the flappers 40 engage the inner cage 36 covering the plurality of inner cage openings 48. Referring to FIG. 3, with the inner cage openings 48 covered, the airflow 42 is diverted through the bypass passage 44 and to the passage exit 20, bypassing the ram air fan 24.

The flappers 40 are each connected to the support 38 via, for example, a hinge connection 50 at a pivot axis 52. To move between the open position, illustrated in FIG. 2 and the closed position illustrated in FIG. 6, the flapper 40 is rotated about the pivot axis 52. In some embodiments, an angle of rotation of the flapper 40 between the open position and closed position is less than 45 degrees. In other embodiments, the angle of rotation is 40 degrees.

Figure 7:
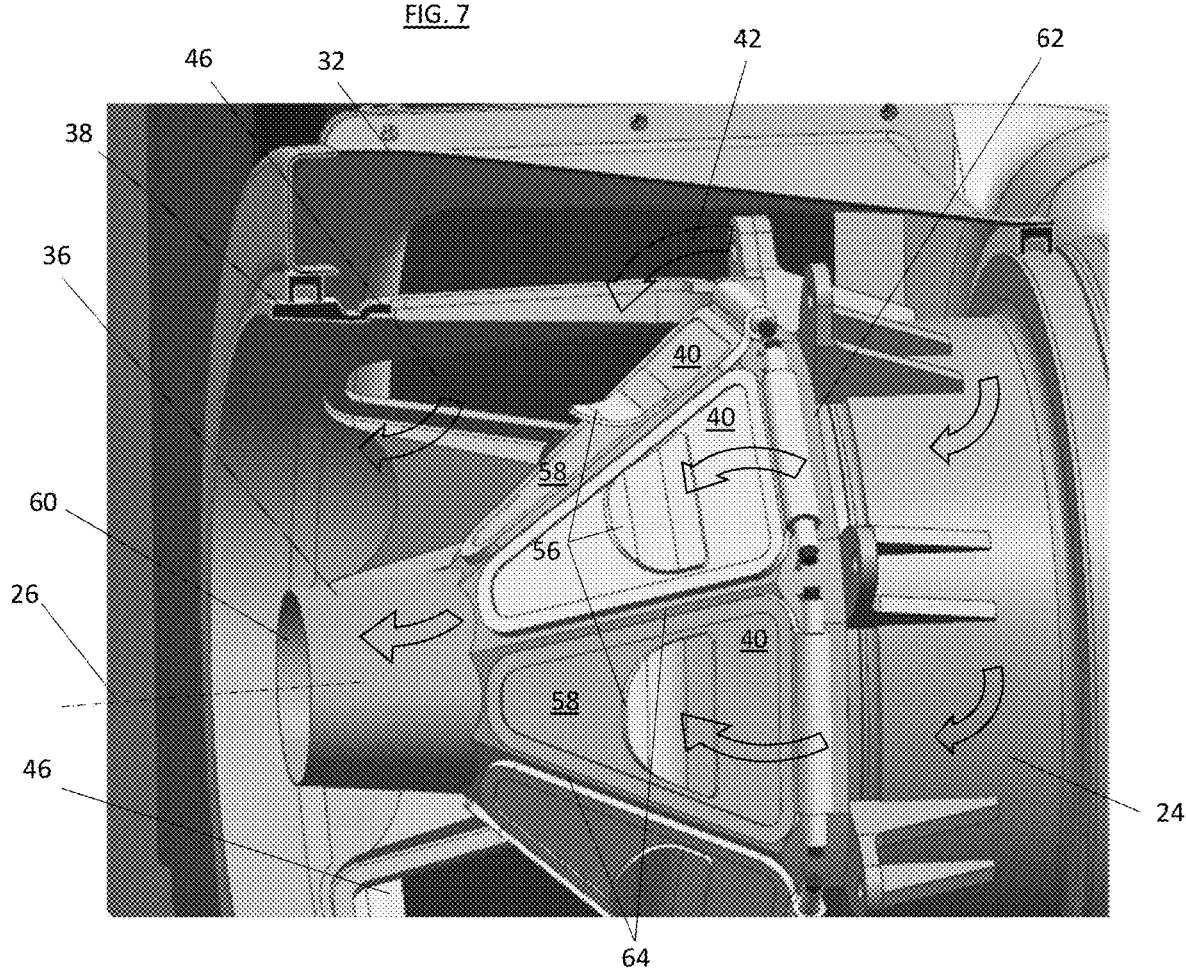
FIG. 7 another cross-sectional view of an embodiment of a ram air fan and fan bypass/shutoff check valve assembly.

In some embodiments, the flappers 40 are biased toward the closed position by, for example, a spring or other biasing device (not shown). When the ram air fan 24 is commanded to stop, the flappers 40 move to the closed position due to the lack of positive pressure across the ram air fan 24, and because of the influence of the biasing device. Further, in some embodiments, as shown in FIG. 7, the flapper 40 includes an aerodynamic spoiler 56 extending from an outer surface 58 of the flapper 40, such that the airflow 42 flowing though the bypass passage 44 flows over the spoiler 56, exerting aerodynamic forces on the spoiler 56 and urging the flappers 40 into engagement with the inner cage 36 covering the cage openings 48. In some embodiments, the spoiler 56 extends substantially perpendicularly to a direction of the airflow 42 exiting the bypass passage 44.

Figure 8:
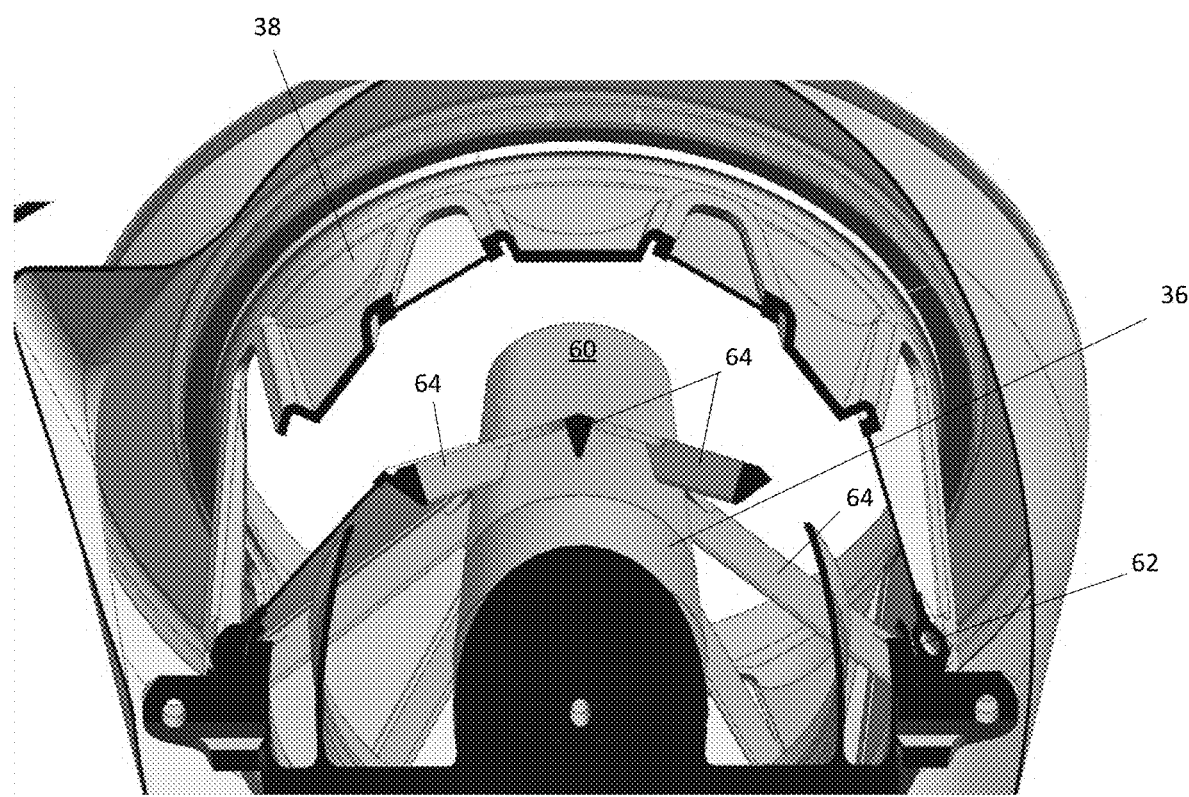
FIG. 8 is yet another cross-sectional view of an embodiment of a ram air fan and fan bypass/shutoff check valve assembly.

Referring again to FIG. 5 and FIG. 7, the inner cage 36 includes a hub 60 located at the central axis 26 and an outer ring 62 coaxial with the hub 60 and defining a radial outwardmost extent of the inner cage 36. A plurality of spokes 64 extend from the hub 60 to the outer ring 62 defining the cage openings 48 between adjacent spokes 62. As shown in FIG. 8, the spokes 64 each have a cross-sectional shape configured to reduce pressure drop through the cage openings 48. As shown the spokes 64 may have a tapered V cross-sectional shape, or alternatively another cross-sectional shape, such as an airfoil shape.

The ram fan bypass duct 32 including the inner cage 36 and flappers 40 movable between the inner cage 36 and the support 38, allows airflow 42 to bypass the ram air fan 24 in-flight thus preventing windmilling of the ram air fan 24 and preventing the need to power the ram air fan 24 during flight to provide airflow to an air bearing of the ram air fan 24.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A check valve for a ram air fan assembly, comprising:
   a support having a plurality of support openings therein in fluid communication with a bypass duct;
   an inner cage disposed in the support having a plurality of cage openings therein; and
   a plurality of flappers rotatably secured to the inner cage, the plurality of flappers movable between the open position covering the plurality of support openings, and the closed position covering the plurality of cage openings;
   wherein each flapper of the plurality of flappers includes a spoiler extending from an outer surface of the flapper over which the airflow from a bypass duct is directed to urge the flapper into the closed position.

2. The check valve of claim 1, wherein the plurality of flappers are biased to the closed position.

3. A check valve for a ram air fan assembly, comprising:
   a support having a plurality of support openings therein in fluid communication with a bypass duct;
   an inner cage disposed in the support having a plurality of cage openings therein; and
   a plurality of flappers rotatably secured to the inner cage, the plurality of flappers movable between the open position covering the plurality of support openings, and the closed position covering the plurality of cage openings;
   wherein the inner cage includes:
      a hub;
      an outer ring; and
      a plurality of spokes extending from the hub to the outer ring, the plurality of cage openings formed between adjacent spokes of the plurality of spokes.

4. The check valve of claim 3, wherein the plurality of spokes are aerodynamically shaped.

* * * * *